(12) United States Patent
Ogura et al.

(10) Patent No.: US 7,056,547 B2
(45) Date of Patent: Jun. 6, 2006

(54) PACKAGED, TEA-BASED BEVERAGES

(75) Inventors: Yoshikazu Ogura, Tokyo (JP); Kazuhiro Otsuka, Tokyo (JP); Susumu Ohishi, Tokyo (JP); Takeshi Yasumasu, Tokyo (JP); Yasushi Yamada, Tokyo (JP)

(73) Assignee: Kao Corporation, Tokyo (JP)

( * ) Notice: Subject to any disclaimer, the term of this patent is extended or adjusted under 35 U.S.C. 154(b) by 37 days.

(21) Appl. No.: 10/964,630

(22) Filed: Oct. 15, 2004

(65) Prior Publication Data

US 2005/0095342 A1    May 5, 2005

(30) Foreign Application Priority Data

Oct. 31, 2003 (JP) .............................. 2003-373222

(51) Int. Cl.
*A23F 3/00* (2006.01)

(52) U.S. Cl. ...................... 426/597; 426/106; 426/590

(58) Field of Classification Search ................ 426/597, 426/106, 590
See application file for complete search history.

(56) References Cited

U.S. PATENT DOCUMENTS

| 5,427,806 A | 6/1995 | Ekanayake et al. |
| 6,268,009 B1 | 7/2001 | Ekanayake et al. |
| 2002/0034576 A1 | 3/2002 | Burgess |
| 2003/0077374 A1* | 4/2003 | Ohishi et al. ................ 426/597 |
| 2003/0096050 A1* | 5/2003 | Inaoka et al. ................ 426/597 |

FOREIGN PATENT DOCUMENTS

EP    0 416 667 A1    3/1991

* cited by examiner

*Primary Examiner*—Anthony Weier
(74) *Attorney, Agent, or Firm*—Oblon, Spivak, McClelland, Maier & Neustadt, P.C.

(57) ABSTRACT

Provided are packaged, tea-based beverages, which contain non-polymer catechins at high concentration, are reduced in bitterness, acridness and the like, and are improved in flavor and taste. They contain the following ingredients (A), (B) and (C):

(A) from 320 mg/500 mL to 1,300 mg/500 mL of non-polymer catechins,
(B) caffeine, and
(C) water, wherein:
(D) the content of non-epicatechins in the non-polymer catechins is from 40 to 80 wt. %,
(E) the weight ratio of the non-polymer catechins to the caffeine is from 5 to 8,
(F) the weight ratio of the non-polymer catechins to total polyphenols is from 0.88 to 1.0,
(G) the turbidity is 0.7 or lower, and
(H) the pH is from 5 to 7.

9 Claims, No Drawings

PACKAGED, TEA-BASED BEVERAGES

FIELD OF THE INVENTION

This invention relates to packaged, tea-based beverages.

BACKGROUND OF THE INVENTION

As effects of catechins, there have been reported a suppressing effect on the increase of cholesterol and an inhibitory effect on α-amylase activity (see, for example, JP-A-60-156614 and JP-A-03-133928). For such physiological effects to manifest, it is necessary for an adult to drink tea as much as 4 to 5 cups a day. Accordingly, there has been a great demand for a technological method by which catechins can be added to beverages at a high concentration in order to facilitate the ingestion of a large amount of catechins. As one of the methods for this, catechins are added in a dissolved form to a beverage by using a green tea concentrate (see, for example, JP-A-59-219384, JP-A-4-20589 and JP-A-61-130285) or the like.

Where non-polymer catechins are extracted from tea leaves at high concentration for adding them at high concentration in a beverage, there is an inevitable drawback that compared with general beverages containing non-polymer catechins at low concentration, not only the bitterness and astringency derived from the non-polymer catechins but also the bitterness of caffeine, acridness of unidentified ingredients and the like synergistically increase, resulting in a beverage having the flavor and taste which are considerably different from those inherent to tea.

SUMMARY OF THE INVENTION

The present inventors have, therefore, proceeded with an investigation to make improvements in flavor and taste while keeping the concentration of non-polymer catechins high. As a result, it has been found that a packaged, tea-based beverage reduced in bitterness and acridness and having the inherent flavor and taste of tea can be obtained by regulating the concentration of non-epicatechins in the non-polymer catechins, the content ratios of caffeine and total polyphenols to the non-polymer catechins and the turbidity and pH in predetermined ranges.

In a first aspect of the present invention, there is thus provided a packaged, tea-based beverage containing the following ingredients (A), (B) and (C):
- (A) from 320 mg/500 mL to 1,300 mg/500 mL of non-polymer catechins,
- (B) caffeine, and
- (C) water, wherein:
- (D) the content of non-epicatechins in the non-polymer catechins is from 40 to 80 wt. %,
- (E) the weight ratio of the non-polymer catechins to the caffeine is from 5 to 8,
- (F) the weight ratio of the non-polymer catechins to total polyphenols is from 0.88 to 1.0,
- (G) the turbidity is 0.7 or lower, and
- (H) the pH is from 5 to 7.

The packaged, tea-based beverage according to the present invention contains non-polymer catechins at high concentration, is reduced in bitterness and acridness, and is improved in the inherent flavor and taste of tea. Further, it is low in turbidity, so that it can be distributed in clear packages.

DETAILED DESCRIPTION OF THE INVENTION

The term "non-polymer catechins" as used herein is a generic term, which collectively encompasses non-epicatechins such as catechin, gallocatechin, catechingallate and gallocatechingallate, and epicatechins such as epicatechin, epigallocatechin, epicatechingallate and epigallocatechingallate.

The packaged, tea-based beverage according to the present invention contains the non-polymer catechins (A), each of which is a non-polymer and in a dissolved form in water, at from 320 mg/500 mL to 1,300 mg/500 mL, preferably from 320 mg/500 mL to 1,000 mg/500 mL, more preferably from 320 mg/500 mL to 499 mg/500 mL, even more preferably from 360 mg/500 mL to 480 mg/500 mL, still more preferably from 380 mg/500 mL to 480 mg/500 mL, yet still more preferably from 400 mg/500 mL to 480 mg/500 mL. In so far as the content of non-polymer catechins falls within the above-described range, a great deal of non-polymer catechins can be taken with ease while effectively and sufficiently reducing bitterness and acridness.

The "concentration of non-polymer catechins" as used herein is defined based on the total amount of eight types of non-polymer catechins consisting of catechin, gallocatechin, catechingallate, gallocatechingallate, epicatechin, epigallocatechin, epicatechingallate and epigallocatechingallate, including the total amount of non-polymer non-epicatechins such as catechin, gallocatechin, catechingallate and gallocatechingallate.

In the packaged, tea-based beverage according to the present invention, the content of the non-epicatechins in the non-polymer catechins is required to be from 40 to 80 wt. % from the standpoint of effectively improving the long-term stability, flavor and taste of the packaged, tea-based beverage. The content of the non-epicatechins may be preferably from 46 to 80 wt. %, more preferably from 50 to 80 wt. %, even more preferably from 54 to 80 wt. %. The content of the non-epicatechins is defined as a weight percentage, which is obtained by dividing the total value of the concentrations of catechin, gallocatechin, catechingallate and gallocatechingallate by the total value of the concentrations of the non-polymer catechins.

The weight ratio of the non-polymer catechins to the caffeine in the packaged, tea-based beverage according to the present invention is from 5 to 8, preferably from 6 to 8, more preferably from 7 to 8 from the standpoint of effectively reducing bitterness and acridness. If this ratio is smaller than 5, the bitterness becomes stronger due to the high caffeine content. A ratio greater than 8 results in stronger astringency or the like.

The weight ratio of the non-polymer catechins to total polyphenols in the packaged, tea-based beverage according to the present invention is from 0.88 to 1.0, preferably from 0.9 to 1.0, more preferably from 0.92 to 1.0, even more preferably from 0.94 to 1.0, even still more preferably from 0.96 to 1.0. If this ratio is smaller than 0.88, acridness or the like tends to come forward.

The term "total polyphenols" as used herein means ingredients quantitated by the method that by using ethyl gallate as a standard solution, their total amount is determined as an amount converted to gallic acid by the ferrous tartrate method (referential publication: "Green Tea Polyphenols", Technology Series for the Effective Utilization of Functional Ingredients for Beverages and Foods, No. 10). In general, non-polymer catechins and their polymers and the like can be detected by this measurement method.

Further, from 40 to 100 wt. %, preferably from 45 to 100 wt. %, more preferably from 50 to 100 wt. %, even more preferably from 60 to 95 wt. % of the non-polymer catechins may preferably consist of one or more gallates selected from epigallocatechingallate, gallocatechingallate, epicatechingallate and catechingallate, because the balance in flavor and taste between the gallates and caffeine can be improved further and the inherent flavor and taste of tea can be enjoyed. From the standpoint of physiological effects, it is also preferred to contain a greater number of gallates.

From the standpoint of the flavor, taste and external appearance, the turbidity of the packaged, tea-based beverage according to the present invention is required to be 0.7 or lower. The turbidity may be preferably 0.5 or lower, more preferably 0.1 or lower, even more preferably 0.05 or lower, even still more preferably 0.025 or lower. The packaged, tea-based beverage according to the present invention having a low turbidity as described above can be distributed in clear packages, especially as a beverage filled in clear PET packages on the market.

From the standpoint of the taste and the chemical stability of non-polymer catechins, it is preferred to set the pH of the packaged, tea-based beverage according to the present invention at from 5 to 7 at 25° C.

It is also preferred to control the content of dietary fibers to from 0.5 to 10 wt. %, preferably from 1 to 7 wt. %, more preferably from 3 to 7 wt. % in the packaged, tea-based beverage according to the present invention to make improvements in bitterness and acridness. Examples of the dietary fibers include gum arabic, alginic acid, carageenan, agar, xanthan gum, guar gum, psylium seed husk gum, gellan gum, gelatin, tamarind seed polysaccharides, tara gum, pharcellulan, pectin, locust been gum, polydextrose, and carboxymethylcellulose. The dietary fibers as described herein can be selected from food additives.

The non-polymer catechins for use in the present invention can be obtained by extraction with water or hot water from tea leaves of green tea such as sencha (middle-grade green tea), gyokuro (shaded green tea) or tencha (powdered tea) prepared from green tea leaves available from the Genus Camellia, for example, C. sinensis, C. assamica, the Yabukita variety, or a hybrid thereof, semi-fermented tea generally called oolong tea such as tekkannon (Tieguangin), irotane, ougonkei (Huangjigui) or buigancha (Wuyiyaucha), or fermented tea (i.e., black tea) such as Darjeeling, Assam or Sri Lanka.

The extraction of tea can be carried out by a conventional method such as stirring extraction. An organic acid or organic acid salt, such as sodium ascorbate, can be added beforehand to water which is to be used for extraction. It is also possible to make combined use of boiling deaeration or an extraction method which is conducted while bubbling an inert gas such as nitrogen gas to eliminate dissolved oxygen, that is, under a so-called non-oxidizing atmosphere.

As a method for adjusting the weight ratio of the non-polymer catechins to total polyphenols in the packaged, tea-based beverage according to the present invention, a concentrate of a tea extract may be used in a dissolved form in water, or a tea beverage, which is commonly consumed, and a concentrate of a tea extract may be used in combination. As a medium useful ford issolving the concentrate of the tea extract, water, carbonated water, a tea extract or the like containing non-polymer catechins at a commercial level, or the like can be mentioned. The term "the concentrate of a tea extract" as used herein means one obtained by concentrating an extract of tea leaves in hot water or a water-soluble organic solvent, and as its forms, various forms can be mentioned such as a solid, aqueous solution and slurry. On the other hand, the term "tea extract" as used herein include those prepared by processes exemplified in detail in JP-A-59-219384, JP-A-4-20589, JP-A-5-260907, JP-A-5-306279 and the like, and as commercial products, "POLYPHENON™" (product of Mitsui Norin Co., Ltd.), "TEAFURAN™" (product of ITO EN, LTD.), "SUNPHENON™" (product of Taiyo Kagaku Co., Ltd.), "SUN OOLONG™" (product of Suntory Limited) can be mentioned. In addition, catechins originated from other raw materials, column-purified catechins and chemically synthesized catechins can also be used. As the tea extract or the concentrate of the tea extract, it is preferred from the viewpoint of a taste to use one having a non-polymer catechin concentration of 40 wt. % or higher, preferably from 40 to 90 wt. %, more preferably from 50 to 90 wt. %, especially from 50 to 85 wt. % based on its solid content.

Non-epicatechins can be obtained by preparing an aqueous solution of an extract of green tea, semi-fermented tea, fermented tea or the like or a concentrate of such a tea extract and subjecting the resultant solution to heat treatment, for example, at from 40 to 140° C. for from 0.1 minute to 120 hours. From the ease in forming non-epicatechins, it is preferred to adjust the pH of the solution to 5 or higher in the consideration of the easiness of purification of non-epicatechins. As an alternative, a concentrate of a tea extract having a high non-epicatechin content can be used. They can be used either singly or in combination. By such treatment or procedure, the content of non-epicatechins can be controlled.

To control the non-polymer catechins/caffeine weight ratio to from 5 to 8, it is possible to employ a procedure making use of the method that a tea extract, a concentrate of a tea extract or a mixture thereof is brought into contact with a caffeine absorbent (JP-A-53-18722), the method that a tea extract, a concentrate of a tea extract or a mixture thereof is brought into contact with activated clay or acid clay (JP-A-6-142405), or the like. In particular, to allow the composition of non-polymer catechins to remain unchanged, the method that a concentrate of a green tea extract is dissolved in a 9/1 to 1/9 mixed solution of ethanol and water by weight ratio and the solution is brought into contact with activated carbon and acid clay or activated clay is preferred.

An adjustment of the turbidity, on the other hand, can be effected by using methods such as diatomaceous earth filtration, centrifugal separation, microfiltration, ultrafiltration and creaming down, either singly or in combination.

The packaged, tea-based beverage according to the present invention contains water, and the amount of water in the beverage ispreferablynot less than 80 wt. %, more preferably not less than 85 wt. %, still more preferably not less than 90 wt. %, evenmore preferably from 90 to 99.9 wt. %, and particularly preferably from 95 to 99.9 wt. %.

Examples of the packaged, tea-based beverage according to the present invention include green tea beverages, semi-fermented tea beverages and fermented tea beverages, within which green-tea-based beverages are more preferred.

To the packaged, tea-based beverage according to the present invention, it is possible to add, in combination with the ingredients derived from tea, additives—such as antioxidants, flavorants, various esters, organic acids, organic acid salts, inorganic acids, inorganic acid salts, inorganic salts, colorants, emulsifiers, preservatives, seasoning agents, sweeteners, sour seasonings, fruit extracts, vegetable extracts, flower honey extracts, pH regulators and quality stabilizers—either singly or in combination to adjust its flavor, taste and/or quality.

Examples of the sweeteners include sugar, glucose, fructose, isomerized syrup, glycyrrhizin, stevia, aspartame, fructooligosaccharide, galactooligosaccharide, and other oligosaccharides such as cyclodextrins. Usable examples of the cyclodextrins include α-, β- and γ-cyclodextrins and branched α-, β- and γ-cyclodextrins. In addition, artificial sweeteners can also be used.

Examples of the sour seasonings include, in addition to fruit juices and the like extracted from natural sources, citric acid, tartaric acid, malic acid, lactic acid, fumaric acid, and phosphoric acid.

Examples of the inorganic acids and inorganic acid salts include phosphoric acid, disodium phosphate, sodium metaphosphate, and sodium polyphosphate. Examples of the organic acids and organic acid salts include citric acid, succinic acid, itaconic acid, malic acid, and sodium citrate.

Similar to general beverages, a package useful for the packaged, tea-based beverage according to the present invention can be provided in an ordinary form such as a molded package made of polyethylene terephthalate as a principal component (aso-called PET bottle), a metal can, a paper container combined with metal foils or plastic films, or a bottle. Among such packaged, tea-based beverages, a beverage filled in a clear PET package is preferred.

The packaged, tea-based beverage according to the present invention can be produced, for example, by filling the tea beverage in a container such as a metal can and, when heat sterilization is feasible, conducting heat sterilization under sterilization conditions as prescribed in the Food Sanitation Act. For those which cannot be subjected to retort sterilization like PET bottles or paper containers, a process is adopted such that the tea beverage is sterilized beforehand under similar sterilization conditions as those described above, for example, by a plate-type heat exchanger, is cooled to a particular temperature, and is then filed in a container. Under aseptic conditions, additional ingredients may be added to and filled in a filled container. It is also possible to conduct an operation such that subsequent to heat sterilization under acidic conditions, the pH of the tea beverage is restored to neutral under aseptic conditions or that subsequent to heat sterilization under neutral conditions, the pH of the tea beverage is restored to the acidic side under neutral conditions.

The following examples further describe and demonstrate embodiments of the present invention. The examples are given solely for the purpose of illustration and are not to be construed as limitations of the present invention.

EXAMPLES

Measurement of Non-Polymer Catechins

A high-performance liquid chromatograph (model: SCL-10AVP) manufactured by Shimadzu Corporation was used. The chromatograph was fitted with an LC column packed with octadecyl-introduced silica gel, "L-Column, TM ODS" (4.6 mm in diameter×250 mm in length; product of Chemicals Evaluation and Research Institute, Japan). A beverage, which had been filtrated through a filter (0.8 μm), was subjected to chromatography at a column temperature of 35° C. by gradient elution. A 0.1 mol/L solution of acetic acid in distilled water and a 0.1 mol/L solution of acetic acid in acetonitrile were used as mobile phase solution A and mobile phase solution B, respectively. The measurement was conducted under the conditions of 10 μL injected sample quantity and 280 nm UV detector wavelength.

Measurement of Turbidity

Using a spectrophotometer (Model: U-2010) manufactured by Hitachi, Ltd., each packaged beverage was placed in a glass cell and measured at 25° C. The measurement wavelength of the spectrophotometer at the time of the analysis was set at 660 nm.

Measurement of Total Polyphenols

Using ethyl gallate as a standard solution, total polyphenols were determined as an amount converted to gallic acid by the ferrous tartrate method (referential publication: "Green Tea Polyphenols", Technology Series for the Effective Utilization of Functional Ingredients for Beverages and Foods, No. 10). Specifically, a sample (5 mL) was stained with the standard ferrous tartrate solution (5 mL). With a phosphate buffer, the volume of the thus-stained sample was adjusted to 25 mL. Its absorbance was measured at 540 nm, and from a calibration line for ethyl gallate, the total polyphenols were determined.

Preparation of the standard ferrous tartrate solution: Ferrous sulfate heptahydrate (100 mg) and potassium sodium tartrate (Rochelle salt, 500 mg) were dissolved with distilled water to 100 mL.

Preparation of the phosphate buffer: A 1/15 M solution of disodium hydrogenphosphate and a 1/15 M solution of sodium dihydrogenphosphate were mixed to give pH of 7.5.

Measurement of Caffeine Amount (Analyzer)

A high-performance liquid chromatograph (manufactured by Hitachi, Ltd.) was used.

Plotter: "D-2500", Detector: "L-4200", Pump: "L-7100", Autosampler: "L-7200", Column: "Intersil ODS-2" (2.1 mm inner diameter×250 mm length).

(Analytical Conditions)

Injected sample quantity: 10 μL
Flow rate: 0.3 mL/min
Detection wavelength of UV spectrophotometer: 280 nm
Eluent A: 0.1 M solution of acetic acid in water
Eluent B: 0.1 M solution of acetic acid in acetonitrile
Conditions of concentration gradient (vol. %)

| Time | Eluent A | Eluent B |
| --- | --- | --- |
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |
| 49 min | 97% | 3% |
| 62 min | 97% | 3% |

(Retention Time of Caffeine)

Caffeine: 27.2 min

From each area % determined here, the corresponding wt. % was determined based on the standard substance.

1) Production of a Purified Solution of a Green Tea Extract

A green tea extract concentrate ("POLYPHENON™ HG", product of Tokyo Food Techno Co., Ltd.) hadanon-polymercatechin content of 33.70 wt. %, a caffeine content of 5.5 wt. %, a non-polymer catechins/caffeine ratio of 6.1, and a gallates content of 50.7 wt. %, and the pH of its water-diluted solution (Brix 20) was 4.7. "POLYPHENON™ HG" (100 g, product of Tokyo Food Techno Co., Ltd.) was suspended in a 95% aqueous solution of ethanol (490.9 g) under stirring at 250 rpm at room temperature. After activated carbon "KURARAY COAL™ GLC" (10 g, product of Kuraray Chemical K.K.) and acid clay "MIZKA ACE™ #600" (20 g, product of Mizusawa Chemical Industries, Ltd.) were poured, the resulting mixture was continuously stirred for about 10 minutes. Subsequent to the dropwise addition of a 40% aqueous solution of ethanol (409.1 g) over 10 minutes, stirring was continued for about 30 minutes at room temperature. After the activated carbon and aprecipitate were filtered off by No. 2 filter paper, the filtrate was filtered again through a 0.2 µm membrane filter. Finally, deionized water (200 g) was added to the filtrate, ethanol was distilled off at 40° C. under 3.33 kPa, and then, the Brix was adjusted with deionized water to 24.1 to obtain a purified solution.

The thus-obtained purified solution had the following composition: the concentration of non-polymer catechins: 10%, caffeine: 0.9%, total polyphenols: 11.9%, and gallates content: 54%.

non-polymer catechins: 0.2%, caffeine: 0.056%, total polyphenols: 0.208%, and gallates content: 48%.

Examples 1–2 & Comparative Examples 1–5

Each green tea beverage filled in clear PET packages was prepared by combining the ingredients in accordance with the formulation in table 1, adjusting the pH of the resultant mixture to 6, sterilizing the mixture at 137° C. for 30 seconds, and then filling the thus-sterilized mixture in 500-mL PET packages.

After stored at 40° C. for 1 week, the beverage obtained as described above was ranked in flavor and taste by 10 expert panelists in accordance with the below-described raking standards. The results are shown in Table 1.

3: Deliciousness, bitterness and astringency are well balanced.
2: Average.
1: Deliciousness, bitterness and astringency are poorly balanced.

TABLE 1

| | | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|---|
| Formulation | | | | | | | | |
| Purified solution of green tea extract[1] | g | 90 | 165 | 0 | 150 | 10 | 400 | Comm'l product[7] Opq. can |
| Green tea extract[2] | g | 5000 | 5000 | 25000 | 1000 | 10000 | 10000 | |
| Sodium ascorbate[3] | g | 25 | 27.5 | 46 | 26 | 4 | 3.1 | |
| Cyclodextrin[4] | g | 50 | 55 | 92 | 52 | 80 | 92 | |
| Sodium bicarbonate[5] | g | Balance | Balance | Balance | Balance | Balance | Balance | |
| Flavorant[6] | g | q.s. | q.s. | q.s. | q.s. | q.s. | q.s. | |
| Deionized water | g | Balance | Balance | Balance | Balance | Balance | Balance | |
| Total amount | g | 25000 | 27500 | 46000 | 26000 | 40000 | 31000 | |
| Post-treatment | | | | | | | | |
| Heat treatment (137° C., 30 sec) | | Applied | Applied | Applied | Applied | Applied | Applied | Unknown |
| Analytical data after the post-treatment | | | | | | | | |
| Conc'n of non-polymer catechins | [mg/500 mL] | 372 | 472 | 532 | 320 | 257 | 664 | 398 |
| Conc'n of caffeine | [mg/500 mL] | 73 | 78 | 154 | 37 | 72 | 67 | 90.5 |
| Conc'n of total polyphenols | [mg/500 mL] | 414 | 535 | 554 | 376 | 270 | 785 | 490 |
| Cont. of non-epicatechins | [wt. %] | 53 | 52 | 55 | 50 | 53 | 51 | 51 |
| Non-polymer catechins/caffeine | [—] | 5.1 | 6 | 3.4 | 8.7 | 3.5 | 9.9 | 4.4 |
| Non-polymer catechins/total polyphenols | [—] | 0.9 | 0.88 | 0.96 | 0.85 | 0.95 | 0.84 | 0.81 |
| Turbidity (660 nm) | [—] | 0.011 | 0.015 | 0.022 | 0.019 | 0.008 | 0.025 | 0.798 |
| Gallates content | [wt. %] | 50.8 | 51.7 | 48 | 53 | 48 | 53.7 | — |
| PH | | 6 | 6 | 6 | 6 | 6 | 6 | 6 |
| Ranking results of flavor and taste (after storage at 40° C. for 1 week) | | 3 | 3 | 1 (with acrid and coarse tastes) | 1 (w/o deliciousness) | 3 | 1 (with coarse taste) | 2 (with coarse taste) |

[1] Purified product of "POLYPHENON HG" (product of Tokyo Food Techno Ltd.),
[2] Extract of a fourth tea harvest from Nara,
[3] Daiichi Fine Chemical Co., Ltd.,
[4] NIHON SHOKUHIN KAKO CO., LTD.,
[5] TOSOH CORPORATION,
[6] T. HASEGAWA CO., LTD.,
[7] Brand name ("OSUSHIYASAN NO OCHA")

2) Production of a Green Tea Extract

A fourth tea harvest from Nara of green tea leaves was extracted at a bath ratio of 30 at 65° C. for 5 minutes. Subsequent to filtration through a 20-mesh screen, the filtrate was filtered through an 80-mesh screen and finally through a zeta membrane. The thus-obtained green tea extract had the following composition: the concentration of As evident from Table 1, the packaged green tea beverage of Comparative Example 1 in which the non-polymer catechins/caffeine ratio was small and the packaged green tea beverage of Comparative Example 2 in which the non-polymer catechins/total polyphenols ratio was small had acrid and coarse tastes and failed to provide the inherent flavor and taste of tea. Further, the packaged green tea beverages of Comparative Examples 4 and 5 in each of which the non-polymer catechins/total polyphenols ratio was small had a coarse taste. In contrast, the packaged green tea beverages of Examples 1 and 2 had a good flavor and taste even after the long-term storage although they contained non-polymer catechins at high concentration. Moreover, no changes were observed on the external appearances of the packaged green tea beverages of Examples 1 and 2.

What is claimed is:

1. A packaged, tea-based beverage comprising the following ingredients (A), (B) and (C):
   (A) from 320 mg/500 mL to 1,300 mg/500 mL of non-polymer catechins,
   (B) caffeine, and
   (C) water, wherein:
   (D) the content of non-epicatechins in said non-polymer catechins is from 40 to 80 wt. %,
   (E) the weight ratio of said non-polymer catechins to said caffeine is from 5 to 8,
   (F) the weight ratio of said non-polymer catechins to total polyphenols is from 0.88 to 1.0,
   (G) the turbidity is 0.7 or lower, and
   (H) the pH is from 5 to 7.

2. The packaged, tea-based beverage according to claim 1, wherein a package is a clear package.

3. The packaged, tea-based beverage according to claim 1 or 2, which is a packaged, green-tea-based beverage.

4. A packaged, tea-based beverage according to any one of claims 1 or 2, which has been obtained by adding a tea extract, which has a non-polymer catechin concentration of from 40 to 90 wt. % based on a solid content thereof, or a concentrate of said tea extract.

5. The packaged, tea-based beverage of claim 1, wherein said non-polymer catechin is present in an amount of 320 mg/500 mL to 1,000 mg/500 mL.

6. The packaged, tea-based beverage of claim 1, wherein said non-polymer catechin is present in an amount of 320 mg/500 mL to 499 mg/500 mL.

7. The packaged, tea-based beverage of claim 1, wherein said content of non-epicatechin is from 46 to 80 wt. %.

8. The packaged, tea-based beverage of claim 1, wherein said weight ratio of said non-polymer catechins to said caffeine is from 6 to 8.

9. The packaged, tea-based beverage of claim 1, wherein said weight ratio of said non-polymer catechins to total polyphenols is 0.9 to 1.0.

* * * * *